United States Patent
Baek et al.

(10) Patent No.: US 8,523,420 B2
(45) Date of Patent: Sep. 3, 2013

(54) BACKLIGHT UNITS AND DISPLAY DEVICES INCLUDING THE SAME

(75) Inventors: Seung Hwan Baek, Seoul (KR); Eui Jeong Kang, Asan-si (KR); Chan-Jae Park, Busan (KR); Young-keun Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/432,313

(22) Filed: Mar. 28, 2012

(65) Prior Publication Data
US 2013/0021818 A1 Jan. 24, 2013

(30) Foreign Application Priority Data

Jul. 22, 2011 (KR) .................. 10-2011-0073286

(51) Int. Cl.
*F21V 7/00* (2006.01)
(52) U.S. Cl.
USPC .................. 362/616; 362/634; 362/97.4
(58) Field of Classification Search
USPC ............ 362/634, 616, 612, 97.3, 97.4
See application file for complete search history.

(56) References Cited

U.S. PATENT DOCUMENTS

| 7,413,334 | B2 | 8/2008 | Baba |
| 7,632,002 | B1* | 12/2009 | Park et al. ............... 362/616 |
| 8,047,669 | B2* | 11/2011 | Bourdelais et al. ........ 362/97.3 |
| 2009/0122227 | A1* | 5/2009 | Hong et al. ............... 349/64 |
| 2010/0045898 | A1 | 2/2010 | Lee et al. |
| 2011/0280045 | A1* | 11/2011 | Baek et al. ............... 362/612 |

FOREIGN PATENT DOCUMENTS

| KR | 1020070031044 A | 3/2007 |
| KR | 100964469 B1 | 6/2010 |

* cited by examiner

*Primary Examiner* — Laura Tso
(74) *Attorney, Agent, or Firm* — Cantor Colburn LLP

(57) ABSTRACT

A display device includes a display panel which displays an image, a backlight unit which supplies the display panel with light, an upper cover, and a lower cover. The upper and lower covers accommodate the display panel and the backlight unit. The backlight unit includes light guide plates spaced apart from each other, a light source part, an optical member and an optical diffusion member overlapping a space between the light guide plates. The optical diffusion member includes a diffusing part and a supporting part. The diffusing part faces the optical member, overlaps the space between the light guide plates, and diffuses light emitted from the light source part toward the optical member through the space between the light guide plates. The supporting part protrudes from a surface of the diffusing part which is opposite to the optical member, and is in a space between the light sources.

29 Claims, 11 Drawing Sheets

BACKLIGHT UNITS AND DISPLAY DEVICES INCLUDING THE SAME

This application claims priority to Korean Patent Application No. 10-2011-0073286, filed on Jul. 22, 2011, and all the benefits accruing therefrom under 35 U.S.C. §119, the entire contents of which are hereby incorporated by reference.

BACKGROUND OF THE INVENTION (1) Field of the Invention

The invention herein relates to a backlight unit and a display device including the backlight unit, and more particularly, to a backlight unit including light guide plates, and a display device including the backlight unit.

(2) Description of the Related Art

Since display devices including a liquid crystal display ("LCD") panel or an electrophoretic display panel ("EDP") to display an image are non-emissive devices having no light source, they need a backlight unit for supplying light thereto.

Such backlight units include a light source for emitting light, and a light guide plate for guiding the light from the light source to a display panel. If necessary, the light guide plate may be provided in plurality.

However, in this case, since the light source is disposed between the light guide plates, light emitted from the light source may leak upward through a space between the light guide plates. Furthermore, the leaking light may degrade displaying quality of the display panel.

BRIEF SUMMARY OF THE INVENTION

The invention provides a backlight unit and a display device including the backlight unit, to thereby improve displaying quality of the display device.

Embodiments of the invention provide backlight units including a plurality of light guide plates, a light source part, an optical member, and an optical diffusion member.

Each of the light guide plates includes a light incident surface through which light is incident, and a light emitting surface through which the light is guided and emitted, and the light guide plates are spaced apart from each other with the light incident surfaces facing each other.

The light source part disposed in a space between the light guide plates, and includes a plurality of light source units each including light sources spaced apart from each other, and at least one printed circuit board on which at least one of the light source units is mounted Neighboring light sources emit light in opposite directions.

The optical diffusion member includes a diffusing part disposed over the space between the light guide plates to diffuse light that is emitted from the light sources, leaks through the space between the light guide plates, and propagates toward the light emitting side of the light guide plates, and at least one supporting part protruding from the diffusing part in a direction opposite to the light emitting side of the light guide plates, and inserted in a space between the light sources.

In some embodiments, the diffusing part may include a reflective film attached thereto on a surface facing the optical member.

In other embodiments, the reflective film may include micro lenses on a surface facing the optical member, or may include diffusion beads therein.

In still other embodiments, the diffusing part may include at least one protrusion protruding toward the optical member to space the light guide plate apart from the optical member.

In even other embodiments, the diffusing part may have a dome or convex shape.

In yet other embodiments, the backlight units may further include a light guide plate supporting member that is disposed under the space between the light guide plates, and is coupled to the optical diffusion member to support the light guide plates.

In further embodiments, the optical diffusion member may include a through hole passing through the diffusing part, the light guide plate supporting member may include a coupling hole corresponding to the through hole, and the backlight unit may further include a coupling member inserted in the through hole and the coupling hole to couple the optical diffusion member to the light guide plate supporting member.

In still further embodiments, the optical diffusion member may include a catching protrusion at a lower end of the supporting part, the catching protrusion may have a greater area than that of the supporting part with respect to a cross-section perpendicular to a direction of light emitted from the light guide plates, and the light guide plate supporting member may be disposed under the light guide plate, and include an accommodating recess in which the catching protrusion is inserted and fixed.

In other embodiments of the invention, display devices include: a display panel displaying an image; the backlight unit supplying the display panel with light; an upper cover; and a lower cover. The upper and lower covers accommodate the display panel and the backlight unit.

In some embodiments, the optical diffusion member may include a through hole passing through the diffusing part, the lower cover may include a coupling hole corresponding to the through hole, and the display device may further include a coupling member inserted in the through hole and the coupling hole to couple the optical diffusion member to the light guide plate supporting member.

BRIEF DESCRIPTION OF THE DRAWINGS

The accompanying figures are included to provide a further understanding of the invention, and are incorporated in and constitute a part of this specification. The drawings illustrate exemplary embodiments of the invention and, together with the description, serve to explain principles of the invention. In the figures.

DETAILED DESCRIPTION OF THE INVENTION

Figure 1:
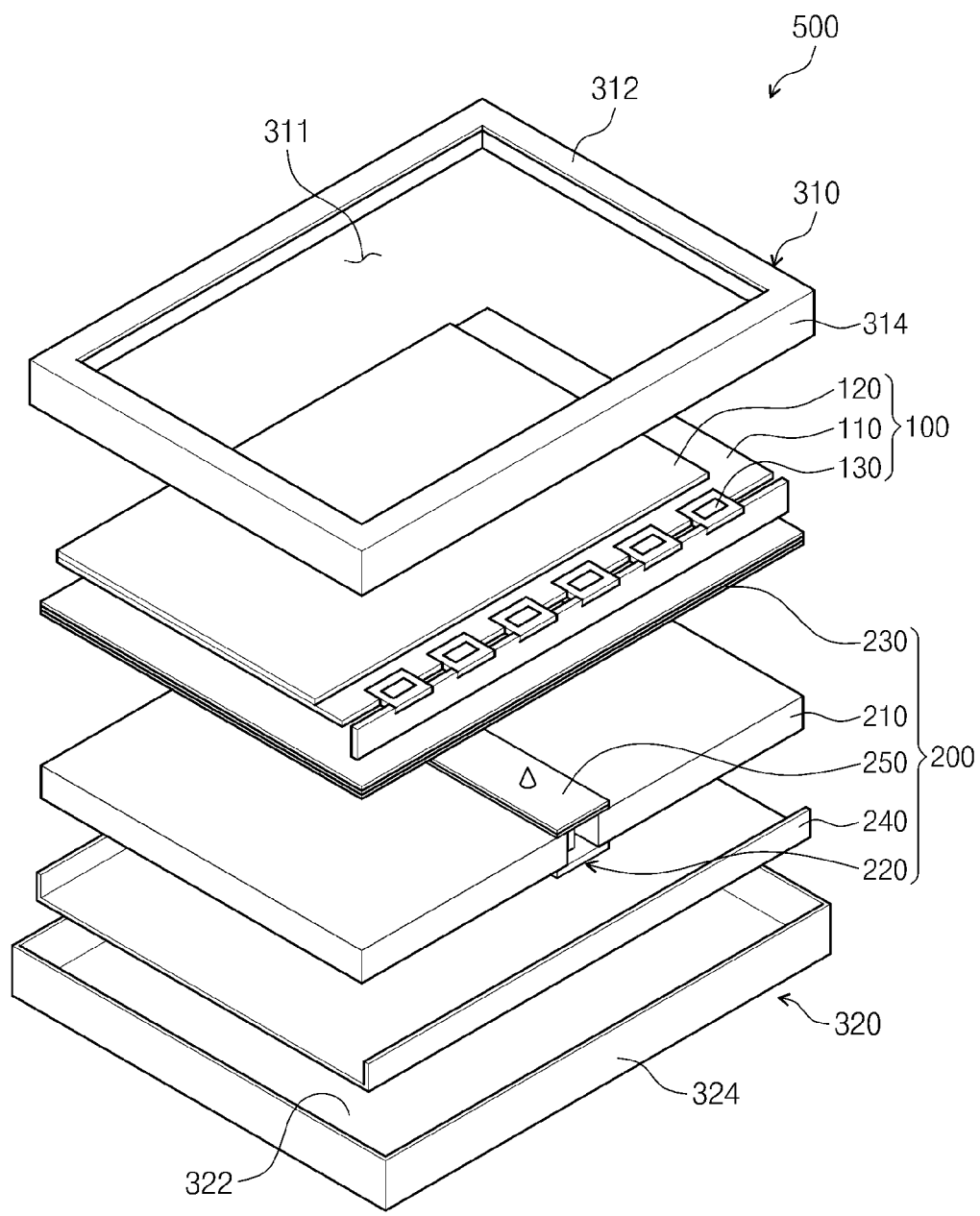
FIG. 1 is an exploded perspective view illustrating an exemplary embodiment of a display device according to the invention.

It will be understood that when an element or layer is referred to as being "on," "connected to" or "coupled to"

another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings.

Figure 2:
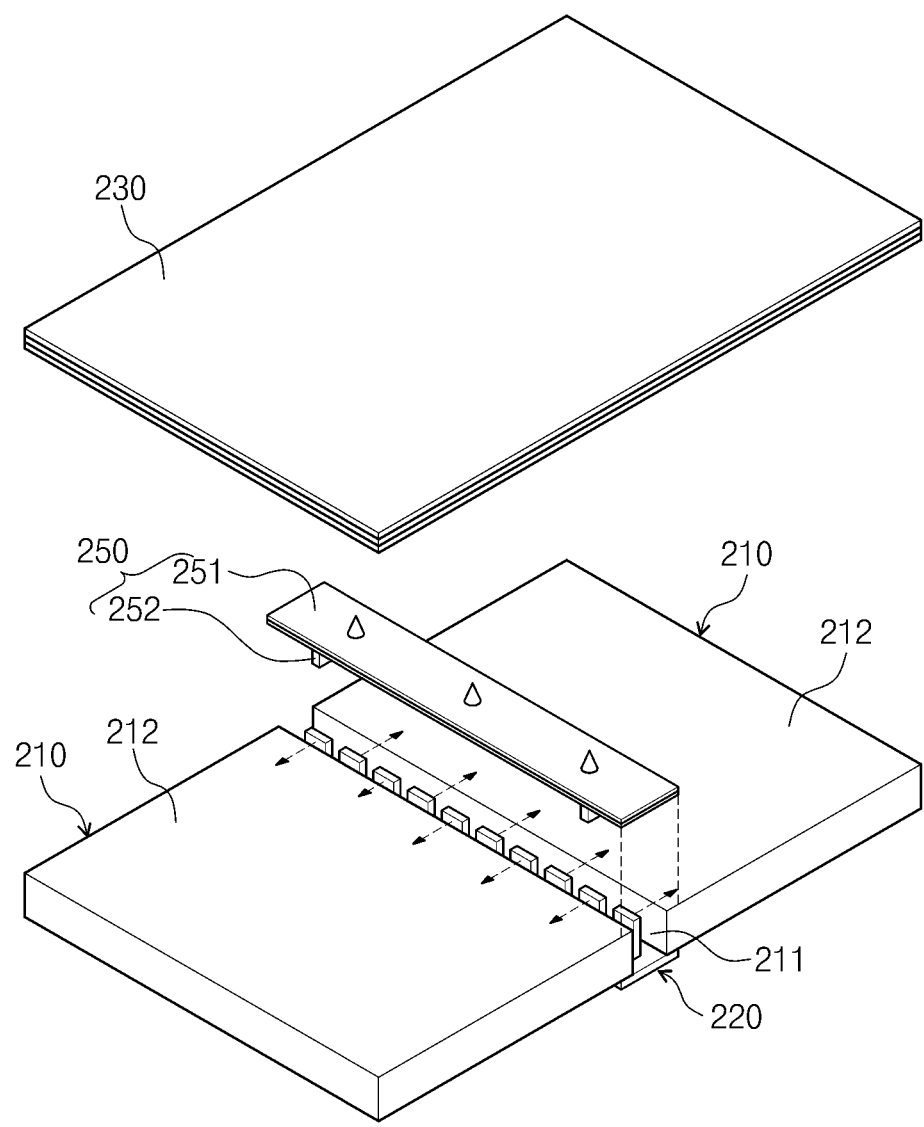
FIG. 2 is an exploded perspective view illustrating a coupling structure of a light source part, light guide plates, an optical diffusion member, and an optical member of FIG. 1.
Figure 3A:
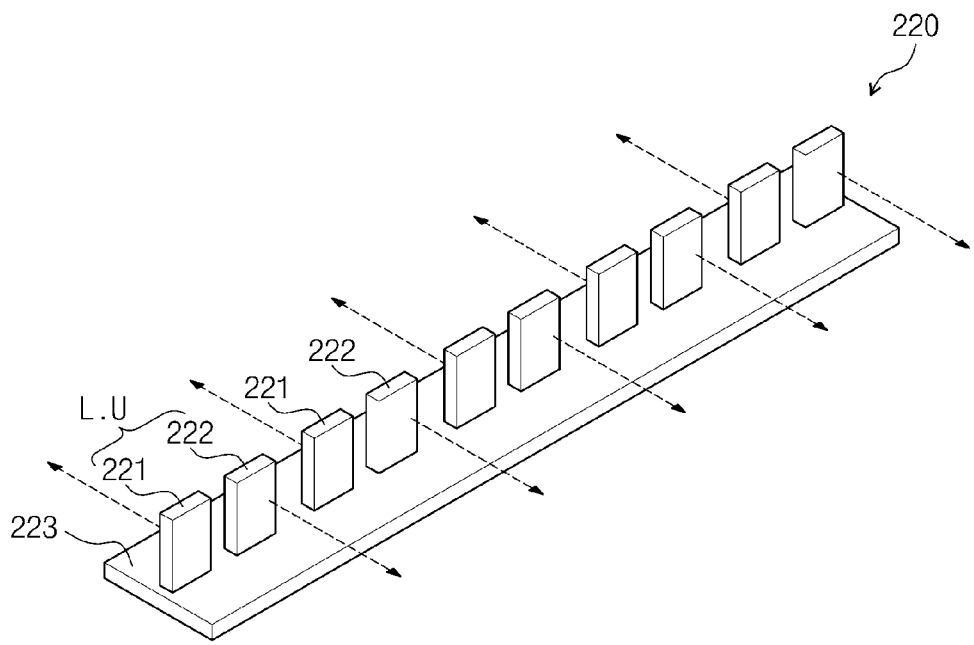
FIGS. 3A and 3B are perspective views illustrating the light source part of FIG. 2.
Figure 3B:
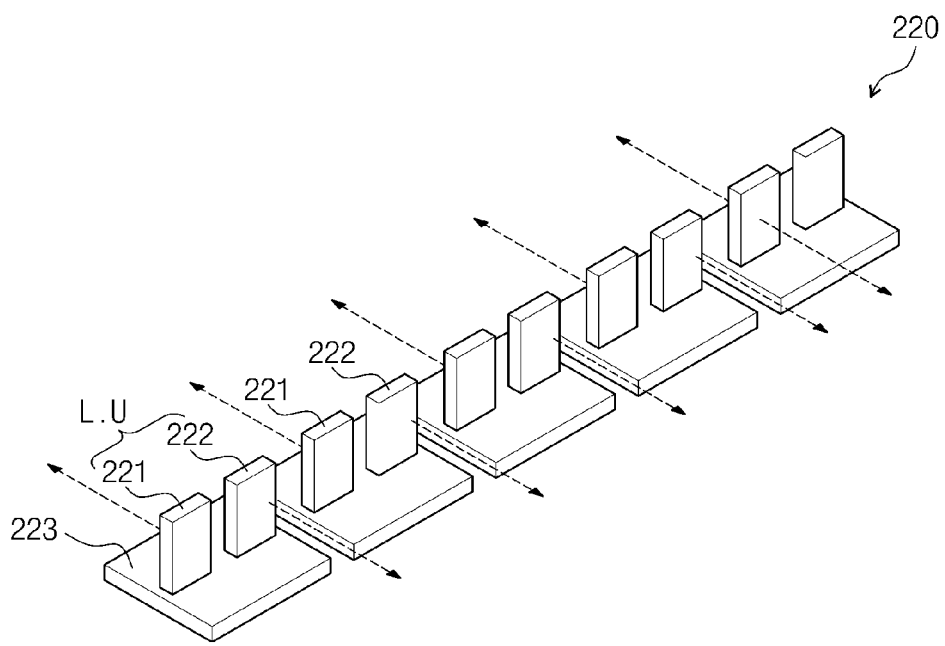

FIG. 1 is an exploded perspective view illustrating an exemplary embodiment of a display device according to the invention. FIG. 2 is an exploded perspective view illustrating a coupling structure of a light source part, light guide plates, an optical diffusion member, and an optical member of FIG. 1. FIGS. 3A and 3B are perspective views illustrating the light source part of FIG. 2.

Referring to FIGS. 1 to 3B, a display device 500 according to the exemplary embodiment includes a display panel 100, a backlight unit 200, an upper cover 310, and a lower cover 320.

The display panel 100 may be any one of various display panels such as a liquid crystal display ("LCD") panel and an electrophoretic display panel ("EDP"). In the exemplary embodiment, a LCD panel is exemplified as the display panel 100.

The display panel 100 has a rectangular plate shape with short and long sides. The display panel 100 includes an array substrate 110, an opposite substrate 120 facing the array substrate 110, and a liquid crystal layer (not shown) disposed between the array substrate 110 and the opposite substrate 120.

The array substrate 110 may include a plurality of pixels (not shown) in a matrix shape. In an exemplary embodiment, each pixel may include a gate line (not shown) extending in a first direction, e.g., in a direction parallel to a side of the array substrate 110, a data line (not shown) extending in a second direction crossed with the first direction and electrically insulated from the gate line, and a pixel electrode (not shown). Each pixel may include a thin film transistor (not shown) that is electrically connected to the gate line, the data line, and the pixel electrode. Each thin film transistor switches a driving signal that is provided to the corresponding pixel electrode. Driver integrated circuits ("ICs") 130 may be disposed at a side of the array substrate 110. The driver ICs 130 receive various signals, and output signals for driving the display panel 100, in response to various input control signals.

The opposite substrate 120 may include a red, green and blue ("RGB") color filter (not shown) and a common electrode (not shown) on a surface thereof The RGB color filter uses light to create a predetermined color. The common electrode is disposed on the RGB color filter, and is opposed to the pixel electrode. The RGB color filter may be formed through a thin film process. The opposite substrate 120 includes the RGB color filter in the exemplary embodiment, but is not limited thereto. In an alternative embodiment, for example, the RGB color filter may be disposed on the array substrate 110.

The liquid crystal layer has a specific arrangement direction according to an electric field formed between the pixel electrode and the common electrode, to thereby adjust the transmissivity of light emitted from the backlight unit 200, so that the display panel 100 can display an image.

The backlight unit 200 is disposed under and overlapping the display panel 100. The backlight unit 200 includes a plurality of light guide plates 210, at least one light source part 220, an optical member 230, a reflective sheet 240, and an optical diffusion member 250 for diffusing light from the light source part 220 leaking between adjacent light guide plates 210.

The light guide plates 210 are adjacent to each other and both disposed under the display panel 100, and guide light emitted from the light source part 220 to the display panel 100. The light guide plates 210 are spaced apart from each other in a plan view of the displace device 500 such that side surfaces thereof face each other. Each of the light guide plates 210 includes a light incident surface 211 through which light is incident, and a light emitting surface 212 emitting the light incident through the light incident surface 211. The light emitting surface 212 may face an incident surface of the display panel 100.

The light source part 220 is disposed between the light guide plates 210, and includes a plurality of light source units L.U including light sources 221 and 222 spaced apart from one another, and at least one printed circuit board 223 on which the light source units L.U are mounted. The light sources 221 and 222 of the light source unit L.U emit light in opposite directions to the light guide plates 210, respectively, as indicated by the dotted line arrows in FIGS. 3A and 3B. In one embodiment, for example, referring to FIG. 3A, the light source units L.U may be mounted on a single board as the printed circuit board 223, to thereby constitute the light source part 220. Alternatively, referring to FIG. 3B, the light source units L.U may be mounted on a plurality of separate boards as a plurality of printed circuit boards 223, respectively, to thereby constitute the light source part 220.

One of the light sources 221 and 222, which emits light to any one of the light guide plates 210, may be referred to as a first light source (also denoted by 221), and the other of the light sources 221 and 222, which emits light to the other of the light guide plates 210, may be referred to as a second light source (also denoted by 222). In this case, power may be separately applied to the first and second light sources 221 and 222 to perform a local dimming operation on the backlight unit 200.

The optical diffusion member 250 includes a diffusing part 251 and supporting parts 252, and diffuses light from the light sources 221 and 222 leaking between the light guide plates 210.

The optical member 230 is disposed between the display panel 100 and the plurality of light guide plates 210. That is, the optical member 230 is disposed at the side of the display panel 100 to which light is emitted from the light guide plates 210, e.g., is disposed over the light emitting surfaces 212 of the light guide plates 210. The optical member 230 controls light emitted from the light guide plates 210. The optical member 230 may include a diffusion sheet, a prism sheet, and/or a protective sheet, which are sequentially stacked on the light guide plates 210.

The diffusion sheet diffuses light emitted from the light source part 220. The prism sheet collects the light, diffused by the diffusion sheet, in a direction perpendicular to a plane of the display panel 100 disposed over the prism sheet. Most of the light passing through the prism sheet is perpendicularly incident to the display panel 100. The protective sheet is disposed on the prism sheet. The protective sheet protects the prism sheet from external shock.

In the exemplary embodiment embodiment, the optical member 230 includes a single sheet as each of the diffusion sheet, the prism sheet, and the protective sheet, but is not limited thereto. Thus, at least one of the diffusion sheet, the prism sheet, and the protective sheet may be provided in plurality to form the optical member 230, or one of the diffusion sheet, the prism sheet, and the protective sheet may be removed.

The reflective sheet 240 reflects otherwise wasted light back to the display panel 100, and is disposed under the light guide plates 210. The reflective sheet 240 includes a light reflecting material. The reflective sheet 240 is disposed on the lower cover 320 to reflect light emitted from the light source part 220. Thus, the reflective sheet 240 increases the amount of light provided to the display panel 100.

The upper cover 310 is disposed over the display panel 100, and has a shape corresponding to the shape of the display panel 100. The upper cover 310 includes an upper surface 312 having a display window 311 exposing the display panel 100 and supporting an edge of the top surface of the display panel 100, and a side surface 314 extending from the upper surface 312 toward the lower cover 320. Since the display panel 100 has a rectangular plate shape, the side surface 312 of the upper cover 310 may include four side surfaces 314. The upper cover 310 is coupled to the lower cover 320 to support the edge of the top surface of the display panel 100.

The lower cover 320 is disposed under the backlight unit 200. The lower cover 320 includes a bottom surface 322 having a shape corresponding to the shapes of the display panel 100 and the backlight unit 200, and a side surface 324 extending upward toward the upper cover 310 from the bottom surface 322. Since the display panel 100 and the backlight unit 200 have a tetragonal shape, the side surface 324 of the lower cover 320 may have four side surfaces 324. The lower cover 320 has a space defined by the bottom surface 322 and the side surface 324, to thereby accommodate the display panel 100 and the backlight unit 200. The lower cover 320 is coupled to the upper cover 310 to accommodate and support the display panel 100 and the backlight unit 200.

Figure 4A:
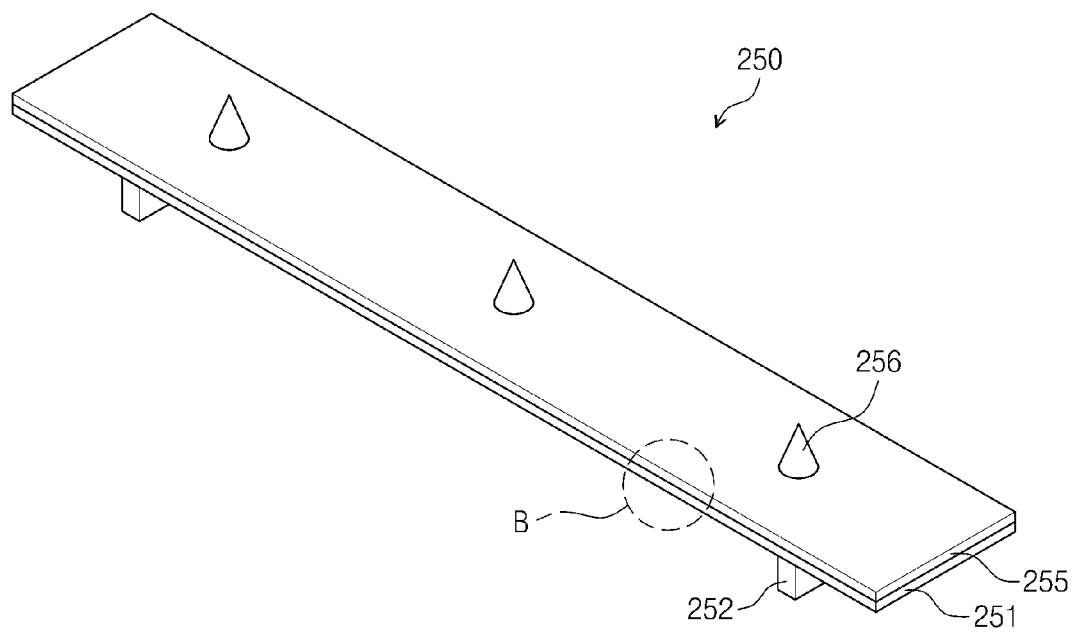
FIGS. 4A to 4C are perspective views illustrating exemplary embodiments of optical diffusion members applicable to a display device according to the invention.
Figure 4B:
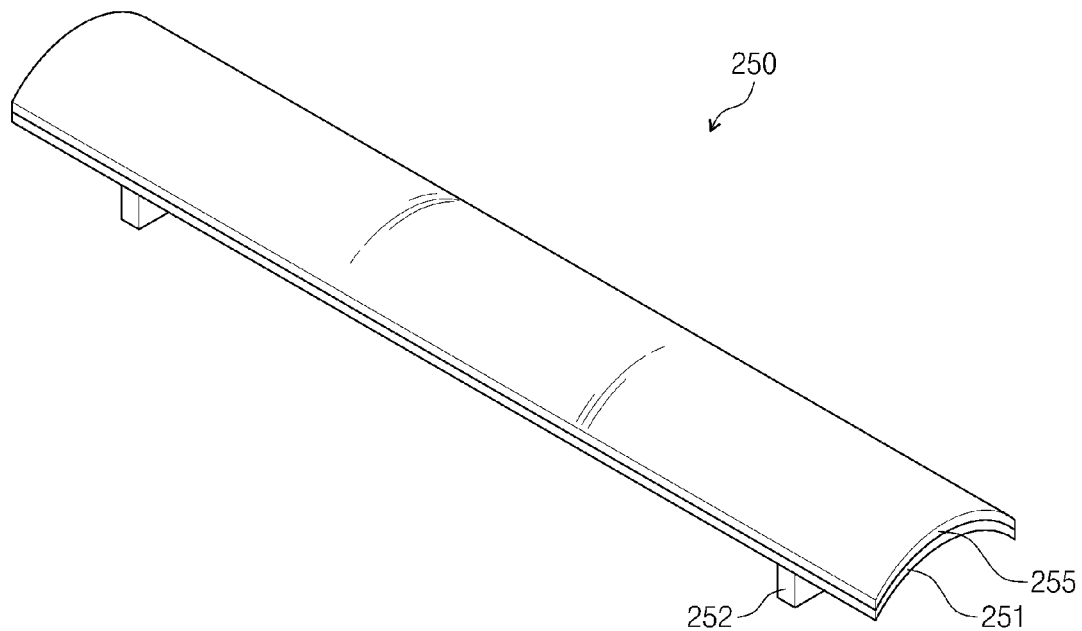
Figure 4C:
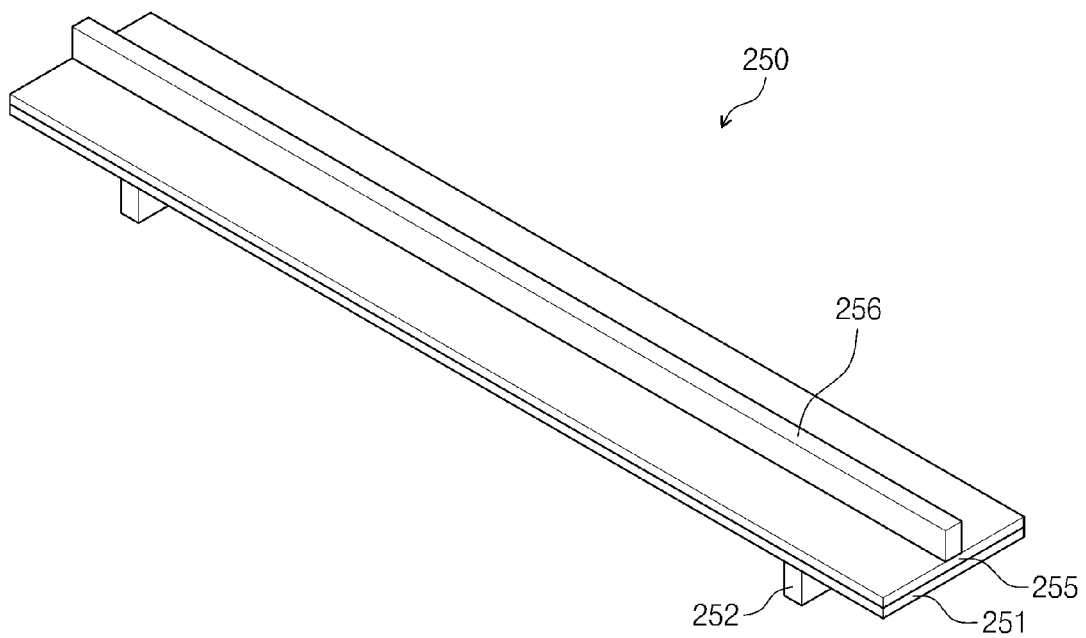
Figure 5A:
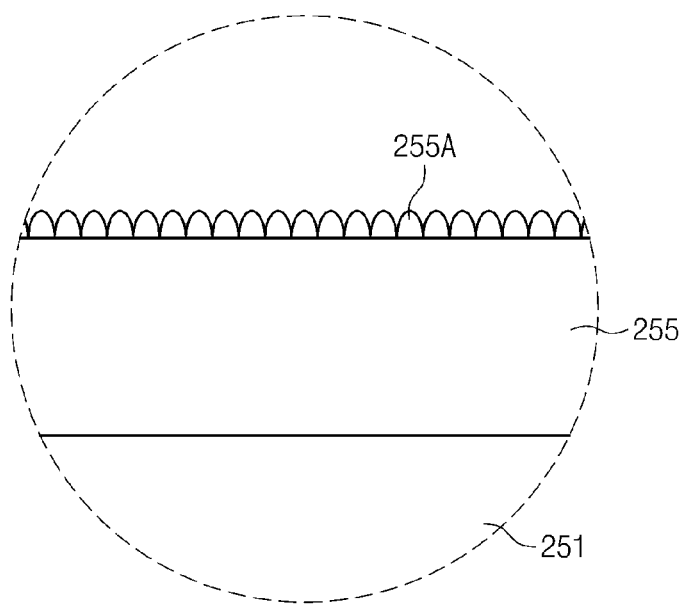
FIGS. 5A and 5B are enlarged views illustrating exemplary embodiments of portion B of FIG. 4A.
Figure 5B:
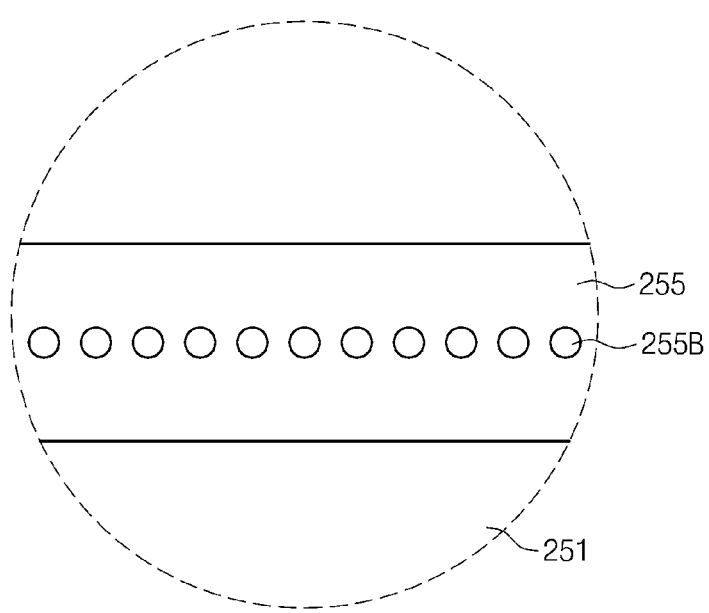
Figure 6:
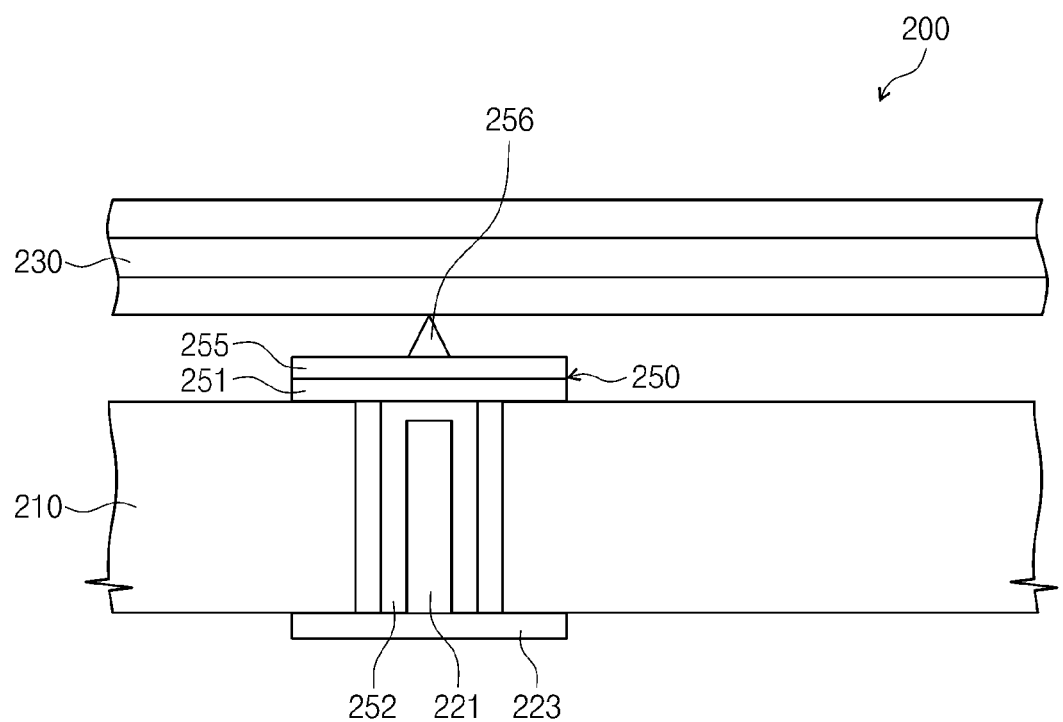
FIG. 6 is a cross-sectional view illustrating an exemplary embodiment of a coupling structure of an optical diffusion member, light guide plates, a light source part, and an optical member according to the invention.

FIGS. 4A to 4C are perspective views illustrating exemplary embodiments of optical diffusion members applicable to a display device according to the invention. FIGS. 5A and 5B are enlarged views illustrating exemplary embodiments of portion B of FIG. 4A. FIG. 6 is a cross-sectional view illustrating an exemplary embodiment of a coupling structure of an optical diffusion member, light guide plates, a light source part, and an optical member according to the invention.

Referring to FIG. 4A, the optical diffusion member 250 includes the diffusing part 251 and the supporting parts 252, and diffuses light leaking between the light guide plates 210 from the light sources 221 and 222.

The diffusing part 251 is disposed over and overlaps a space between the adjacent light guide plates 210. That is, the diffusing part 251 covers the upper portion of the space between the light guide plates 210. The diffusing part 251 diffuses light that leaks between the light guide plates 210 from the light sources 221 and 222, and that propagates in the direction of light emitted from the light guide plates 210. That is, the diffusing part 251 diffuses light that leaks between the light guide plates 210 from the light sources 221 and 222, and that propagates toward the display panel 100.

The diffusing part 251 has a tetragonal plate shape with short and long sides. The length of the long sides of the diffusing part 251 may be equal to or greater than the length of the space between the light guide plates 210. The length of the short sides of the diffusing part 251 may be greater than the width of the space between the light guide plates 210. In one embodiment, for example, the length of the short sides may be from about 10 millimeters (mm) to about 15 mm.

The diffusing part 251 may include one or more protrusions 256 that protrude from a surface facing the optical member 230, to space the optical member 230 a certain distance from the light guide plates 210.

The diffusing part 251 may be provided with a reflective film 255 attached to the surface facing the optical member 230. The reflective film 255 may include a translucent material, e.g., translucent polyethylene terephthalate ("PET"). Referring to FIG. 5A, the reflective film 255 may include micro lenses 255A protruding from the surface facing the optical member 230. Referring to FIG. 5B, the reflective film 255 may include diffusion beads 255B therein. The micro lenses 255A and the diffusion beads 255B diffuse light passing through the reflective film 255 and not reflected by the reflective film 255, thereby emitting the light toward the optical member 230.

The supporting parts 252 protrude from the diffusing part 251 in the opposite direction to the direction of light emitted from the light guide plates 210. The supporting parts 252 are inserted between the light sources 221 and 222 to support the diffusing part 251.

Referring to FIG. 4B, the diffusing part 251 of the optical diffusion member 250 may have a tetragonal plate shape with short and long sides in a dome shape that further protrude to the optical member 230 at an imaginary line connecting the centers of the short sides to each other, than at the long sides. That is, the the optical diffusion member 250 may be convex and protruded toward the optical member 230. Accordingly, the light guide plates 210 are spaced a certain distance from the optical member 230, even if the supporting part 252 is not used.

Referring to FIG. 4C, the diffusing part 251 of the optical diffusion member 250 may have a tetragonal plate shape with short and long sides, and include a protrusion 256 that protrudes from the surface facing the optical member 230, to space the optical member 230 a certain distance from the light guide plates 210. The protrusion 256 may longitudinally extend from one of the short sides of the diffusing part 251 to the other short side, to space the optical member 230 a certain distance from the light guide plates 210. The protrusion 256 in FIG. 4C is a single, unitary, indivisible member, as compared to the plurality of discrete protrusions 256 in FIG. 4A.

Other exemplary embodiments of backlight units, and display devices including the backlight units, according to the invention will now be described with reference to FIGS. 7 to 9. Like reference numerals refer to like elements in FIGS. 1 to 6, and a description thereof will be omitted. Thus, the following embodiments will be described with respect to different parts as those of FIGS. 1 to 6.

Figure 7:
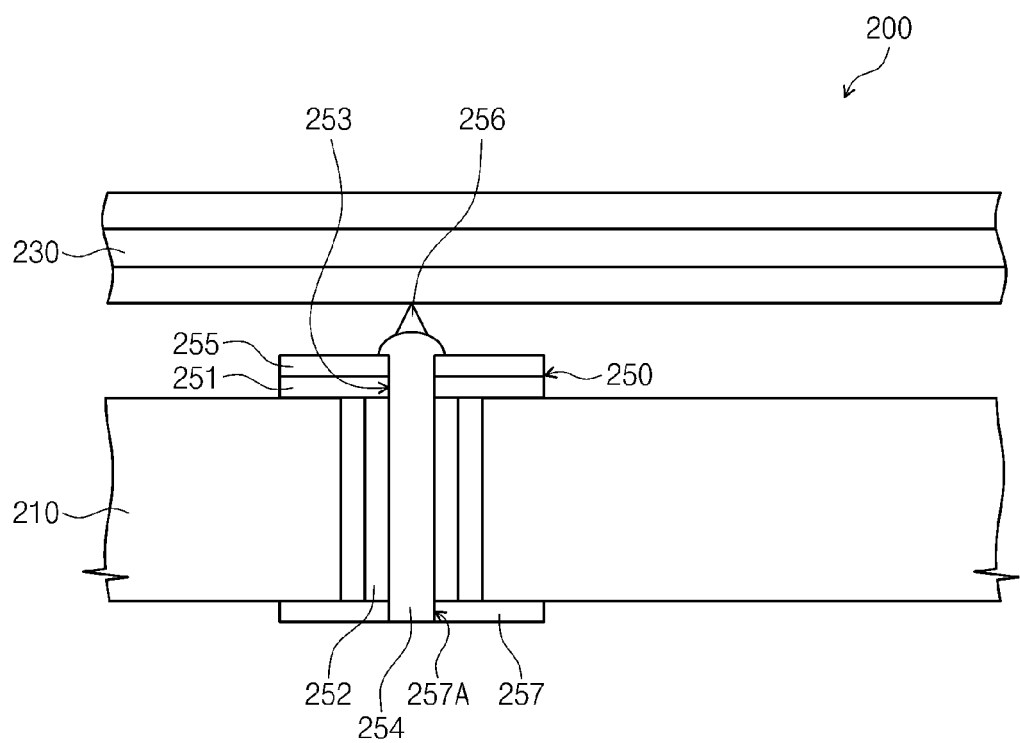
FIGS. 7 to 9 are cross-sectional views illustrating exemplary embodiments of backlight units of display devices according to the invention.

Referring to FIG. 7, another exemplary embodiment of a backlight unit 200 of a display device according to the invention includes a light guide plate supporting member 257 coupled to an optical diffusion member 250 to support light guide plates 210.

The light guide plate supporting member 257 may have a plate shape and be disposed under a space between the light guide plates 210. That is, the light guide plate supporting member 257 is disposed opposite to the surface of the light guide plates 210 facing the optical member 230, and covers the space between the light guide plates 210.

A diffusing part 251 of the optical diffusion member 250 may include a through hole 253, and the light guide plate supporting member 257 may include a coupling hole 257A corresponding to and aligned with the through hole 253.

The light guide plate supporting member 257 is coupled to the optical diffusion member 250 through a coupling member 254 such as a screw or rivet inserted in the through hole 253, to thereby support the light guide plates 210. That is, the diffusing part 251 and the light guide plate supporting member 257 support the light guide plates 210 with a coupling force between the light guide plate supporting member 257 and the optical diffusion member 250. Thus, while the display device is used, a dislocation of the light guide plates 210 due to external shock can be prevented.

Figure 8:
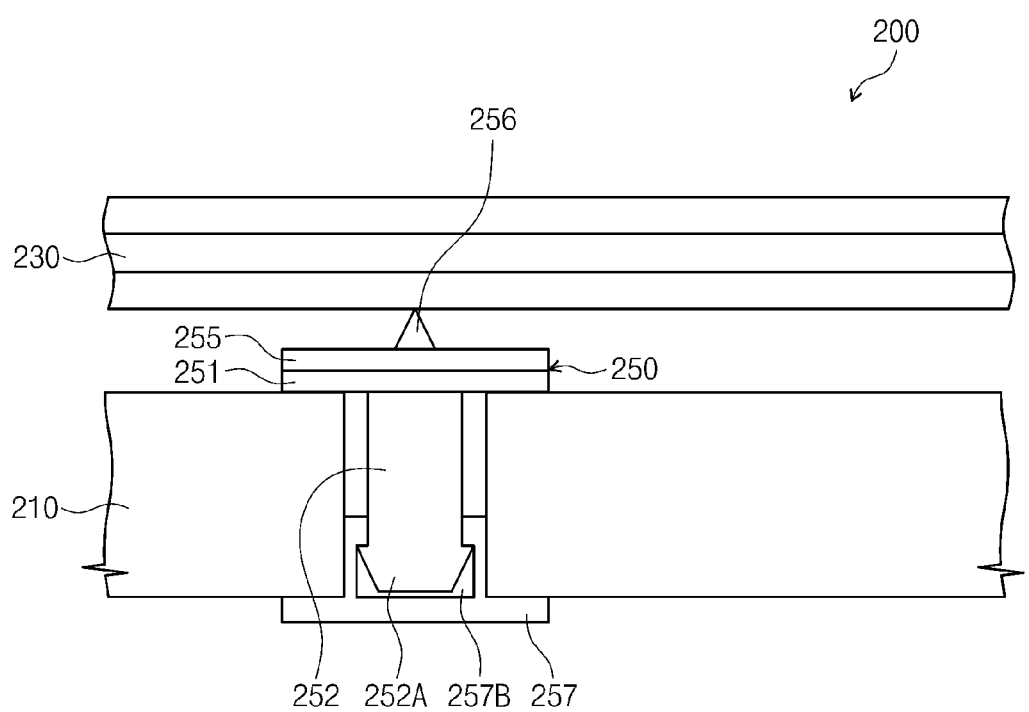

Referring to FIG. 8, another exemplary embodiment of a backlight unit 200 of a display device according to the invention may include a catching protrusion 252A disposed at the lower end of a supporting part 252, and an accommodating recess 257B disposed in the upper portion of a light guide plate supporting member 257. The catching protrusion 252a and the supporting part 252 collectively form a single, unitary indivisible member.

With respect to a cross-section perpendicular to the direction of light emitted from the light guide plates 210, the area of the catching protrusion 252A is greater than that of the supporting part 252.

The catching protrusion 252A may be inserted and accommodated in the accommodating recess 257B.

Accordingly, in the backlight unit 200 including the optical diffusion member 250 and the light guide plate supporting member 257, the optical diffusion member 250 can be coupled to the light guide plate supporting member 257 without using a separate coupling member. That is, the catching protrusion 252A of the optical diffusion member 250 is inserted and accommodated in the accommodating recess 257B of the light guide plate supporting member 257 to couple the optical diffusion member 250 to the light guide plate supporting member 257.

Figure 9:
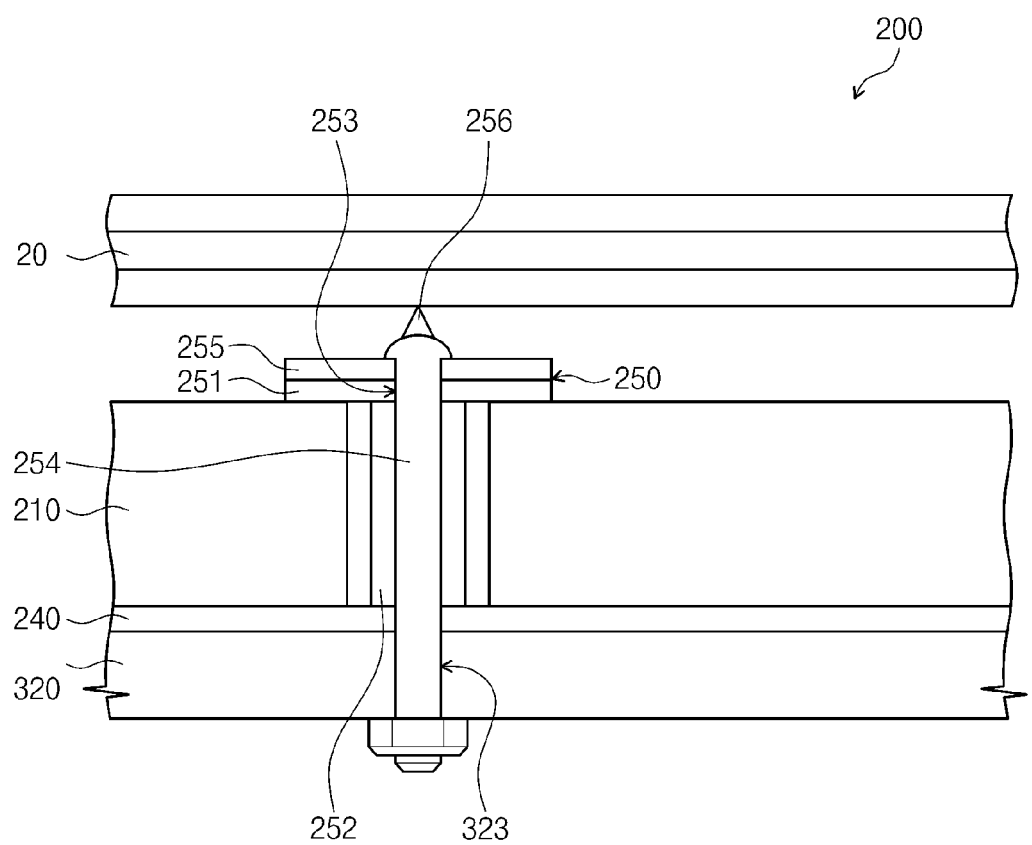

Referring to FIG. 9, another exemplary embodiment of a backlight unit 200 of a display device according to the invention may include a coupling hole 323 extended through a bottom surface 322 of a lower cover 320 at a position corresponding to a supporting part 252 of an optical diffusion member 250. A coupling hole may also be extended through a bottom surface of the reflective sheet 240. The optical diffusion member 250 may include a through hole 253 passing through a diffusing part 251 and the supporting part 252. A coupling member 254 such as a screw or rivet is inserted in the through hole 253 to fix the optical diffusion member 250 to the lower cover 320.

Accordingly, the optical diffusion member 250 can more securely support the light guide plates 210 through the coupling member 254.

According to the embodiments, the backlight unit and the display device including the backlight unit include the optical diffusion member for diffusing light leaking between the light guide plates. Thus, the leaking light, which is not guided by the light guide plates, can be prevented from degrading the displaying quality of the display device.

The above-disclosed subject matter is to be considered illustrative and not restrictive, and the appended claims are intended to cover all such modifications, enhancements, and other embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description.

What is claimed is:

1. A backlight unit comprising:
   a plurality of light guide plates each including a light incident surface through which light is incident, and a light emitting surface through which the light is guided and emitted, wherein the light guide plates are spaced apart from each other with the light incident surfaces facing each other;
   a light source part including a printed circuit board, and a plurality of light source units each including light sources spaced apart from each other and on the printed circuit board, wherein the light source part is in a space between the light guide plates;
   an optical member which faces a light emitting side of the light guide plates; and
   an optical diffusion member including:
      a diffusing part which overlaps the space between the light guide plates and diffuses light which is emitted from the light sources, leaks through the space between the light guide plates, and propagates toward the light emitting side of the light guide plates, and
      a supporting part which protrudes from the diffusing part in a direction opposite to the light emitting side of the light guide plates, and is in a space between the light sources,
   wherein adjacent light sources respectively emit light in opposite directions.

2. The backlight unit of claim 1, wherein the diffusing part comprises a reflective film on a surface thereof which faces the optical member.

3. The backlight unit of claim 2, wherein the reflective film includes a translucent material.

4. The backlight unit of claim 2, wherein the reflective film comprises polyethylene terephthalate.

5. The backlight unit of claim 2, wherein the reflective film comprises micro lenses on a surface thereof which faces the optical member.

6. The backlight unit of claim 2, wherein the reflective film comprises diffusion beads therein.

7. The backlight unit of claim 1, wherein the diffusing part has a tetragonal plate shape with short sides and long sides.

8. The backlight unit of claim 7, wherein the diffusing part comprises a protrusion which protrudes toward the optical member.

9. The backlight unit of claim 8, wherein the protrusion longitudinally extends from a first short side of the diffusing part to a second short side opposite the first short side of the diffusion part.

10. The backlight unit of claim 7, wherein the diffusing part has a convex shape which protrudes toward the optical member at an imaginary line connecting centers of the short sides, further than at the long sides.

11. The backlight unit of claim 1, further comprising a light guide plate supporting member opposite to the diffusing part with respect to the space between the light guide plates, wherein the light guide plate supporting member is coupled to the optical diffusion member and supports the light guide plates.

12. The backlight unit of claim 11, wherein
the optical diffusion member further includes a through hole which passes through the diffusing part,
the light guide plate supporting member comprises a coupling hole which overlaps the through hole, and
the backlight unit further comprises a coupling member which extends through both the through hole and the coupling hole such that the optical diffusion member and the light guide plate supporting member are coupled to each other.

13. The backlight unit of claim 11, wherein
the optical diffusion member further includes a catching protrusion at a lower end of the supporting part,
the catching protrusion has a greater area than that of the supporting part with respect to a cross-section perpendicular to a direction of light emitted from the light guide plates, and
the light guide plate supporting member is opposite to the diffusing part with respect to the space between the light guide plates, and comprises an accommodating recess in which the catching protrusion is inserted and fixed.

14. A display device comprising:
a display panel which displays an image;
a backlight unit which supplies the display panel with light;
an upper cover; and
a lower cover,
wherein the upper and lower covers accommodate the display panel and the backlight unit therein,
wherein the backlight unit includes:
a plurality of light guide plates each including a light incident surface through which the light is incident, and a light emitting surface through which the light is guided and emitted, wherein the light guide plates are spaced apart from each other with the light incident surfaces facing each other;
a light source part including a printed circuit board, and a plurality of light source units each including light sources spaced apart from each other and on the printed circuit board, wherein the light source part is in a space between the light guide plates;
an optical member which faces a light emitting side of the light guide plates; and
an optical diffusion member including:
a diffusing part which is between the optical member and the space disposed between the light guide plates, wherein the diffusion part diffuses light that is emitted from the light sources and leaks through the space between the light guide plates, and
a supporting part which protrudes from the diffusing part in a direction opposite to the light emitting side of the light guide plates, and is in a space between the light sources,
wherein adjacent light sources respectively emit light in opposite directions.

15. The display device of claim 14, wherein the diffusing part comprises a reflective film on a surface thereof which faces the optical member.

16. The display device of claim 15, wherein the reflective film includes a translucent material.

17. The display device of claim 15, wherein the reflective film comprises polyethylene terephthalate.

18. The display device of claim 15, wherein the reflective film comprises micro lenses on a surface thereof which faces the optical member.

19. The display device of claim 15, wherein the reflective film comprises diffusion beads therein.

20. The display device of claim 14, wherein the diffusing part has a tetragonal plate shape with short sides and long sides.

21. The display device of claim 20, wherein the diffusing part comprises a protrusion which protrudes toward to the optical member.

22. The display device of claim 21, wherein the protrusion longitudinally extends from a first short side of the diffusing part to a second short side opposite to the first short side of the diffusing part.

23. The display device of claim 20, wherein the diffusing part has a convex shape which protrudes toward the optical member at an imaginary line connecting centers of the short sides, further than at the long sides.

24. The display device of claim 14, further comprising a light guide plate supporting member opposite to the diffusing part with respect to the space between the light guide plates, wherein the light guide plate supporting member is coupled to the optical diffusion member and supports the light guide plates.

25. The display device of claim 24, wherein
the optical diffusion member further includes a through hole which passes through the diffusing part,
the light guide plate supporting member comprises a coupling hole which overlaps the through hole, and
the display device further comprises a coupling member which extends through both the through hole and the coupling hole such that the optical diffusion member and the light guide plate supporting member are coupled to each other.

26. The display device of claim 25, wherein the coupling member comprises one of a screw and a rivet.

27. The display device of claim 24, wherein
the optical diffusion member further includes a catching protrusion at a lower end of the supporting part, the catching protrusion has a greater area than that of the supporting part with respect to a cross-section perpendicular to a direction of light emitted from the light guide plates, and the light guide plate supporting member is opposite to the diffusion part with respect to the space between the light guide plates, and comprises an accommodating recess in which the catching protrusion is inserted and fixed.

28. The display device of claim 24, wherein the optical diffusion member further includes a through hole which passes through the diffusing part, the lower cover comprises a coupling hole which overlaps the through hole, and the display device further comprises a coupling member which extends through both the through hole and the coupling hole such that the optical diffusion member and the light guide plate supporting member are coupled to each other.

29. The display device of claim 28, wherein the coupling member comprises one of a screw and a rivet.

* * * * *